US012679045B2

(12) United States Patent
Lin et al.

(10) Patent No.: US 12,679,045 B2
(45) Date of Patent: Jul. 14, 2026

(54) SYSTEM FOR BONDING FILMS AND METHOD FOR PREPARING COMPOSITE FILM USING THE SAME

(71) Applicant: PROLOGIUM TECHNOLOGY CO., LTD., Taoyuan City (TW)

(72) Inventors: Jhi-Jhong Lin, Taoyuan City (TW); Chia-Ming Lin, Taoyuan City (TW); Che-Ming Kuo, Taoyuan City (TW)

(73) Assignee: PROLOGIUM TECHNOLOGY CO., LTD., Taoyuan City (TW)

( * ) Notice: Subject to any disclaimer, the term of this patent is extended or adjusted under 35 U.S.C. 154(b) by 53 days.

(21) Appl. No.: 18/812,150

(22) Filed: Aug. 22, 2024

(65) Prior Publication Data

US 2025/0091299 A1      Mar. 20, 2025

(30) Foreign Application Priority Data

Sep. 19, 2023    (TW) ................................. 112135640

(51) Int. Cl.
B29C 65/00          (2006.01)

(52) U.S. Cl.
CPC ........ B29C 66/83413 (2013.01); B29C 66/45 (2013.01)

(58) Field of Classification Search
CPC .............. B29C 66/83413; B29C 66/45; B32B 37/0053; B32B 37/0015; B32B 37/0076; B32B 37/10; B32B 37/12
USPC ........................................................ 156/555
See application file for complete search history.

(56) References Cited

U.S. PATENT DOCUMENTS 11,271,212 B1 *   3/2022   Tiruvannamalai .. H01M 4/0404
2018/0050528 A1    2/2018   Jing

FOREIGN PATENT DOCUMENTS

CN        104760395 A      7/2015
JP        2000211090 A     8/2000
TW        M299605 U       10/2006
WO        2011/093427 A1   8/2011

OTHER PUBLICATIONS

Office Action of correspondence Taiwanese Application No. 112135640, issued on Aug. 6, 2024.
Office Action of corresponding JP application issued Aug. 5, 2025 in Application No. 2024-161161.
Office Action issued Feb. 20, 2026 in KR Application No. KR10-2024-0126474.

* cited by examiner

*Primary Examiner* — James D Sells
(74) *Attorney, Agent, or Firm* — RABIN & BERDO, P.C.

(57) ABSTRACT

A system for bonding films includes a first film, a second film having a plurality of elements, a bonding roller, and a deformable roller having a deformable outer layer. The stiffness of the second film is less than that of the first film. By using the system, the deformable outer layer of the deformable roller produces enough deformation during bonding films to fill the area not covered by the plurality of elements on the second film. Therefore, the second film without sufficient stiffness and the first film can be bonded with each other to produce a composite film without wrinkles. A method for preparing a composite film using the system is also disclosed.

9 Claims, 7 Drawing Sheets

SYSTEM FOR BONDING FILMS AND METHOD FOR PREPARING COMPOSITE FILM USING THE SAME

CROSS REFERENCES TO RELATED APPLICATIONS

The present application claims priority to Taiwanese Patent Application 112135640 filed in the Taiwanese Patent Office on Sep. 19, 2023, the entire contents of which is being incorporated herein by reference.

BACKGROUND OF THE INVENTION

Field of Invention

The present invention relates to a system for bonding films, in particular to a system including a deformable roller having a deformable outer layer for bonding films and method for preparing a composite film using the same.

Related Art

In recent years, various electronic products have developed towards to lightness, thinness and microminiaturization, which has made the application of the film bonding technologies more extensive. The most common film bonding technology is the roll to roll method, which is a high-efficiency, continuous production method, and is a specialized treatment for the flexible thin films. In this method, the cylindrical base material and the cylindrical thin film material to be bonded are pressed by rollers to achieve continuous bonding. After the bonding is completed, it can be rolled into a cylindrical shape or to be cut as a semi-finished product for subsequent processing.

The main key of the thin film bonding is how to bond the thin film without wrinkles to make the lamination be flat. The WO2011093427A1 mainly uses an insulating film, a metal foil, a divider film, a metal foil and an insulating film to be bonded via thermocompression bonding. Two laminates, each with one metal-plated side, can then be separated from the divider film to achieve the flattened bonding.

However, in case of existing elements on the back of the film to be bonded, the elements will form a three-dimensional obstacle. And there will be a gap space between the three-dimensional obstacles. In addition, the thickness of the film is relatively thin, which cannot provide sufficient stiffness. Therefore, wrinkles will be occurred when bonding to another film and make the forming composite film be unflatness. Many techniques are provided to improve the flatness for the thin films bonding. However, the conditions with three-dimensional obstacles are not considered in these techniques. The production machine needs to be stopped during the process to manually remove the wrinkles, so the production speed is relative low and the labor costs are increased.

Therefore, this invention provides a system for bonding films and method for preparing a composite film using the same to overcome the conventional shortages caused by the three-dimensional obstacles.

SUMMARY OF THE INVENTION

It is an objective of this invention to provide a system for bonding films and method for preparing a composite film using the same to overcome the forgoing shortcomings. The surface of the prepared composite film has no wrinkles, so there is no need to stop the production machine to increase the production speed. Also, since no additional manual processing for removing wrinkles is required, the labor costs can be reduced.

In order to implement the abovementioned, this invention discloses a system for bonding films, which includes a first film, a second film, a bonding roller and a deformable roller. The first film has a first surface and a second surface opposed to the first surface, and the second film has a first surface and a second surface opposed to the first surface. The first surface of the second film is configured to orientate to the first surface of the first film. The second film is with a stiffness less than that of the first film. The second surface of the second film includes a plurality of elements and at least one gap space uncovered by the elements. The bonding roller is configured to contact the second surface of the first film. The deformable roller is configured to contact the second surface of the second film and disposed adjacent the bonding roller. The deformable roller has a deformable outer layer and the deformable roller produces deformation to fill the at least one gap space on the second surface of the second film. The bonding roller is configured to indirectly contact to the deformable roller via the first film and the second film, and the deformable roller is configured to indirectly contact to the bonding roller via the first film and the second film. By using the system, the deformable outer layer of the deformable roller produces enough deformation during bonding films to fill the gap space on the second film, which its stiffness is not sufficient. Therefore, the second film without sufficient stiffness and the first film can be bonded with each other to produce a composite film without wrinkles.

According to the embodiment of this invention, each of the elements is a component related to batteries.

According to the embodiment of this invention, a distance between two adjacent elements is 2-150 millimeters.

According to the embodiment of this invention, the deformable roller includes an inner roller covered by the deformable outer layer.

According to the embodiment of this invention, a hardness of the deformable outer layer of the deformable roller is from 15 Shore A to 50 Shore A.

According to the embodiment of this invention, a thickness of the deformable outer layer of the deformable roller is 1-4 millimeters.

According to the embodiment of this invention, the deformable outer layer of the deformable roller is made of a polymer.

According to the embodiment of this invention, the deformable outer layer of the deformable roller is porous.

According to the embodiment of this invention, the bonding roller has a Shore A hardness greater than that of the deformable roller.

Also, the invention provides a method for preparing a composite film by using the above-mentioned system for bonding films. The method includes the steps of:

receiving the first film by the bonding roller and pressing the first surface of the first film toward to the first surface of the second film, and receiving the second film by the deformable roller and pressing the first surface of the second film toward to the first surface of the first film, wherein the deformable outer layer of the deformable roller produces deformation to fill the at least one gap space on the second surface of the second film; and obtaining the composite film that the first film is bonded to the second film.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
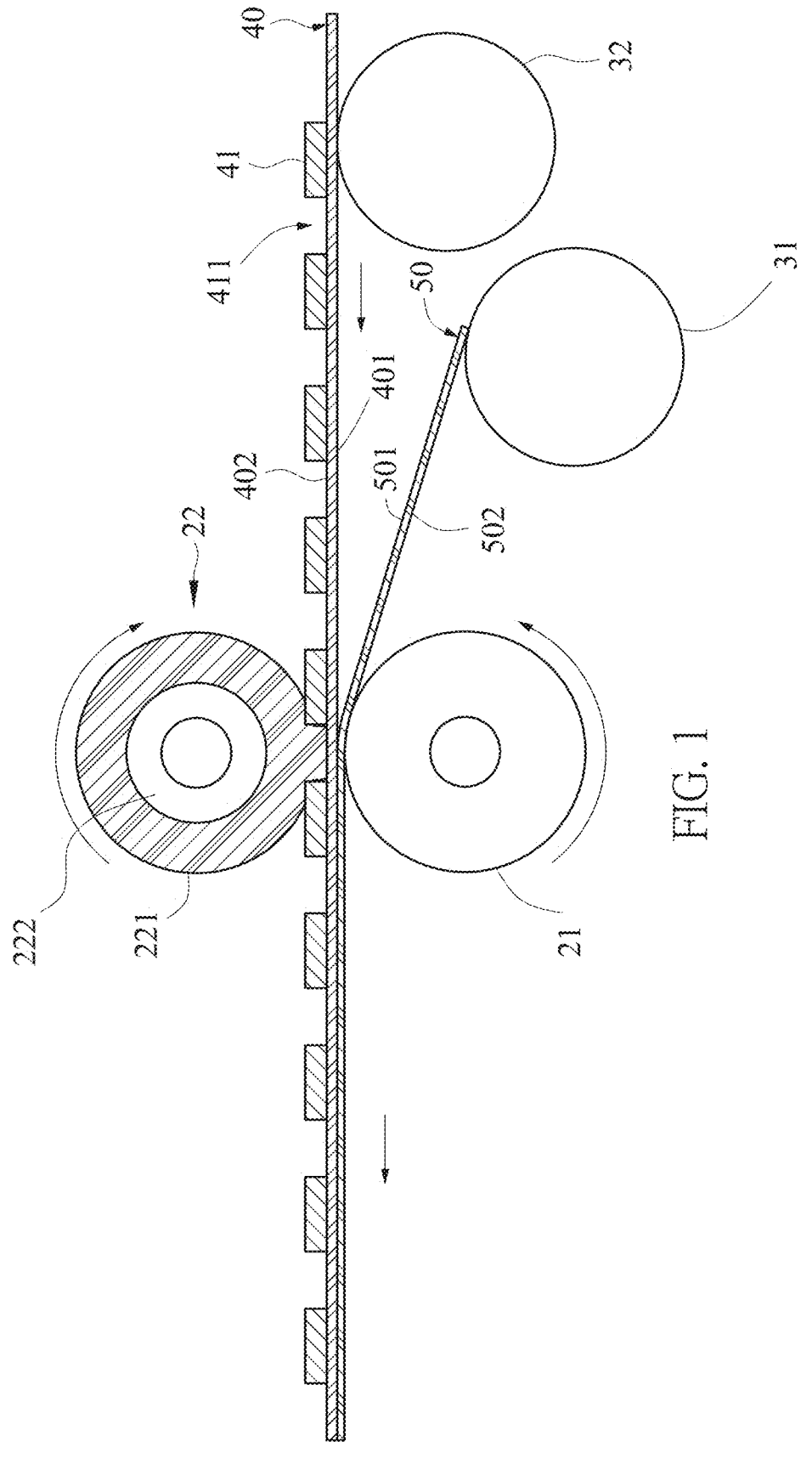
FIG. 1 is a schematic diagram of the embodiment of the system for bonding films of this invention.

FIG. 1 is a schematic diagram of the embodiment of the system for bonding films of this invention. The system for bonding films includes a first film 50, a second film 40 including a plurality of elements 41, a first feed roller 31, a second feed roller 32, a bonding roller 21 and a deformable roller 22 including a deformable outer layer 221.

The first film 50 is guided by the first feed roller 31 to the bonding roller 50, and the second film 40 is guided by the second feed roller 32 to the deformable roller 22. The bonding roller 21 receives the first film 50 and is configured to indirectly contact to the deformable roller 22 via the first film 50 and the second film 40 for pressing the first film 50 to the second film 40. Also, the deformable roller 22 receives the second film 40 and is configured to indirectly contact to the bonding roller 21 via the first film 50 and the second film 40 for pressing the second film 40 to the first film 50. The deformable outer layer 221 of the deformable roller 22 produces enough deformation during pressing the second film 40 to fill the area not covered by the plurality of elements 41 on the second film 40. Therefore, the second film 40 and the first film 50 can be bonded with each other to produce a composite film without wrinkles. The description here is only for illustration with drawings, and is not intended to limit the amount and the location of the rollers.

In other embodiments, if there are more than three films to be bonded to each other, the number of feeding rollers will increase accordingly.

The first film 50 has a first surface 501 and a second surface 502 opposed to the first surface 501. The first surface 501 is configured to orientate to the second film 40, so that the first surface 501 of the first film 50 is bonded to the second film 40. The thickness of the first film 50 may range from several microns to thousands of microns. The first film 50 is PET (polyethylene terephthalate) or other plastic film with sufficient stiffness.

The second film 40 has a first surface 401 and a second surface 402 opposed to the first surface 401. The first surface 401 is configured to orientate to the first film 50, so that the first surface 401 of the second film 40 is bonded to the first surface 501 of the first film 50. The thickness of the second film 50 is about 0.001-0.02 millimeters (mm), preferably 0.004-0.006 mm. The second film 40 is a metal film, such as a copper thin film or an aluminum thin film, etc. There have a plurality of elements 41 on the second surface 402 of the second film 40 and the areas not covered by the plurality of elements 41. In the areas not covered by the plurality of elements 41, it is defined a gap space 411 between two adjacent elements 41. Therefore, there has at least one gap space 411 on the second surface 402 of the second film 40. The height of each elements 41 is 40-200 micrometers. The distance between two adjacent elements 41 is 2-150 millimeters. The elements 41 are the components related to batteries, such as a positive active material layer, a negative active material layer, a glue frame and etc. Also, each elements 41 may be the same or different components related to batteries. In one embodiment, the elements 41 may be the one of the positive active material layer, the negative active material layer or the glue frame. In another embodiment, the elements 41 may be the positive active material layer, the negative active material layer or the glue frame respectively.

In an embodiment, an adhesive substance is applied to the first surface 501 of the first film 50 for bonding to the first surface 401 of the second film 40. The adhesive substance may be an adhesive glue or an adhesive gel.

In this invention, the second film 40 is with a stiffness less than that of the first film 50. The stiffness is the ability for resisting bending of a thin film. Therefore, in this invention, the second film 40 is easier to generate wrinkles than the first film 50, due to the stiffness of the second film 40 is less than that of the first film 50.

The bonding roller 21 receives the first film 50 guided by the first feed roller 31 and continually contacts to the second surface 502 of the first film 50. The bonding roller 21 may be all kinds of hollow or solid roller, such as a steel roller, a rubber coated roller. The bonding roller 21 has a Shore A hardness greater than that of the deformable roller 22.

Figure 2:
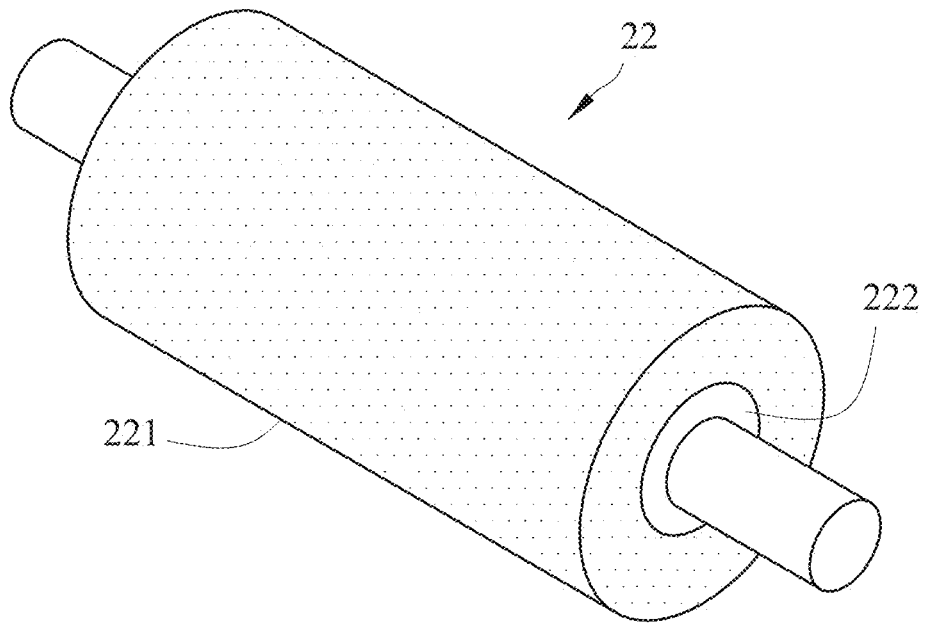
FIG. 2 is a schematic diagram of the embodiment of the deformable roller of the system for bonding films of this invention.

The deformable roller 22 is disposed adjacent the bonding roller 21. The deformable roller 22 receives the second film 40 guided by the second feed roller 32. The deformable roller 22 has a deformable outer layer 221 and an inner roller 222 covered by the deformable outer layer 221, as shown in FIG. 2. A thickness of the deformable outer layer 221 is 1-4 millimeters, which is made of soft polymer or is porous. For example, the polymer is, but not limited to, rubber. The diameter of the inner roller 222 is 50-250 millimeters3. The inner roller 222 may be a steel or an aluminum roller which is solid or hollow. A hardness of the deformable outer layer 221 is from 15 Shore A to 50 Shore A.

Figure 3:
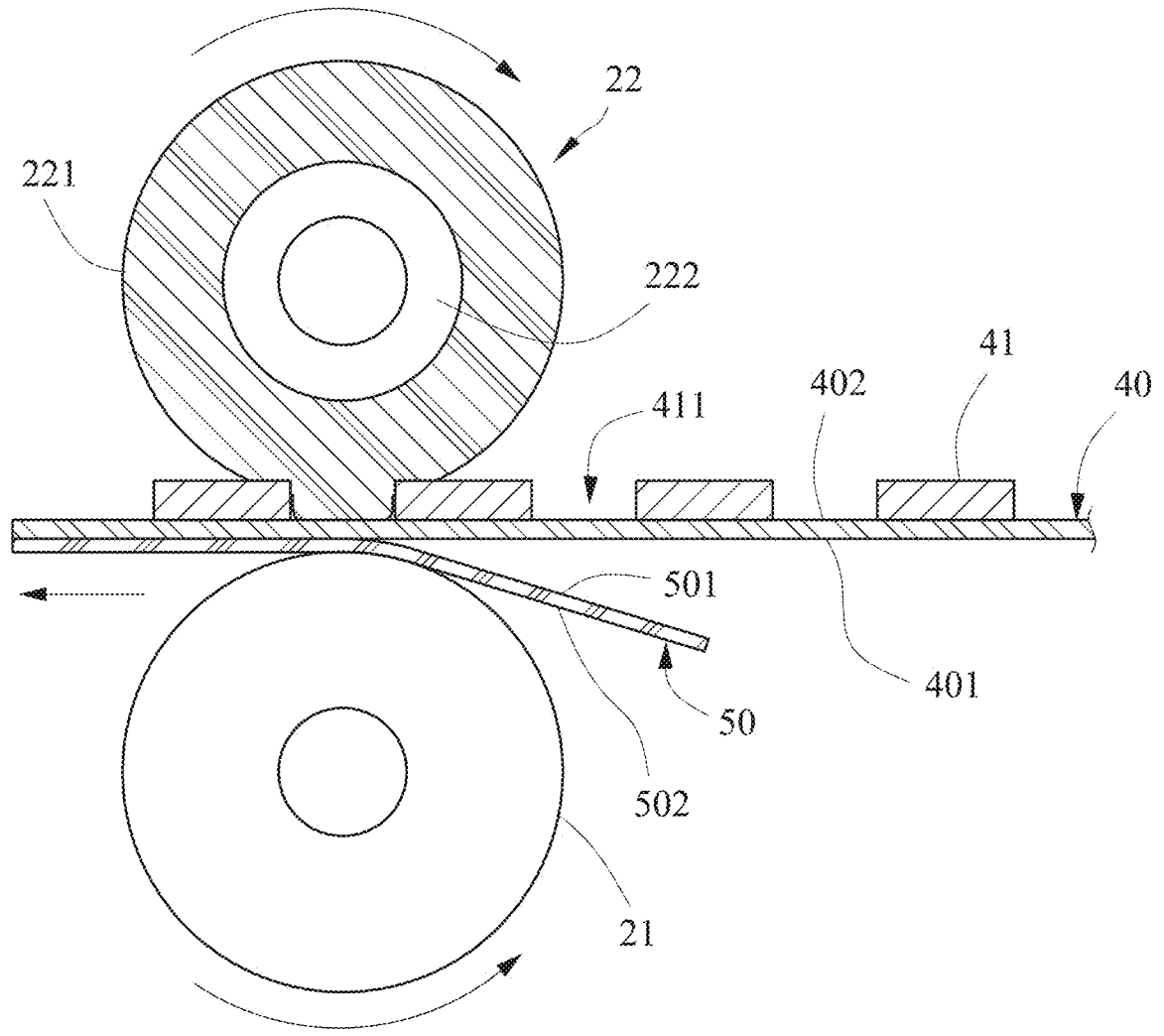
FIG. 3 is a side view of the embodiment of the system for bonding films of this invention, showing the deformable roller and the bonding roller pressing the first film and the second film simultaneously.

As shown in FIG. 3, there have a plurality of elements 41 on the second surface 402 of the second film 40. Since the elements 41 have a certain thickness and weight, they have a certain mechanical strength. Therefore, the stiffness of the areas, which are covered by the elements 41 on the second film 40 can be enhanced. For the areas, which are not covered by the elements 41 on the second film 40, it is easier to generate wrinkles, due to not supported by the elements 41, especially in the gap space 411 between two adjacent elements 41 on the second surface 402. Therefore, in this invention, the deformable outer layer 221 of the deformable roller 22 produces enough deformation during bonding films to fill and press the areas not covered by the plurality of elements 41 on the second surface 402 of the second film 40. In particularly, the deformable outer layer 221 produces enough deformation by against the elements 41 on both sides to fill the gap space 411 to enhance the mechanical strength on this area during bonding. Therefore, when the deformable roller 22 pressing the second film 40 and the bonding roller 21 pressing the first film 50, the first film 50 and the second film 40 can be bonded flatly with each other to produce a composite film without wrinkles.

Figure 4A:
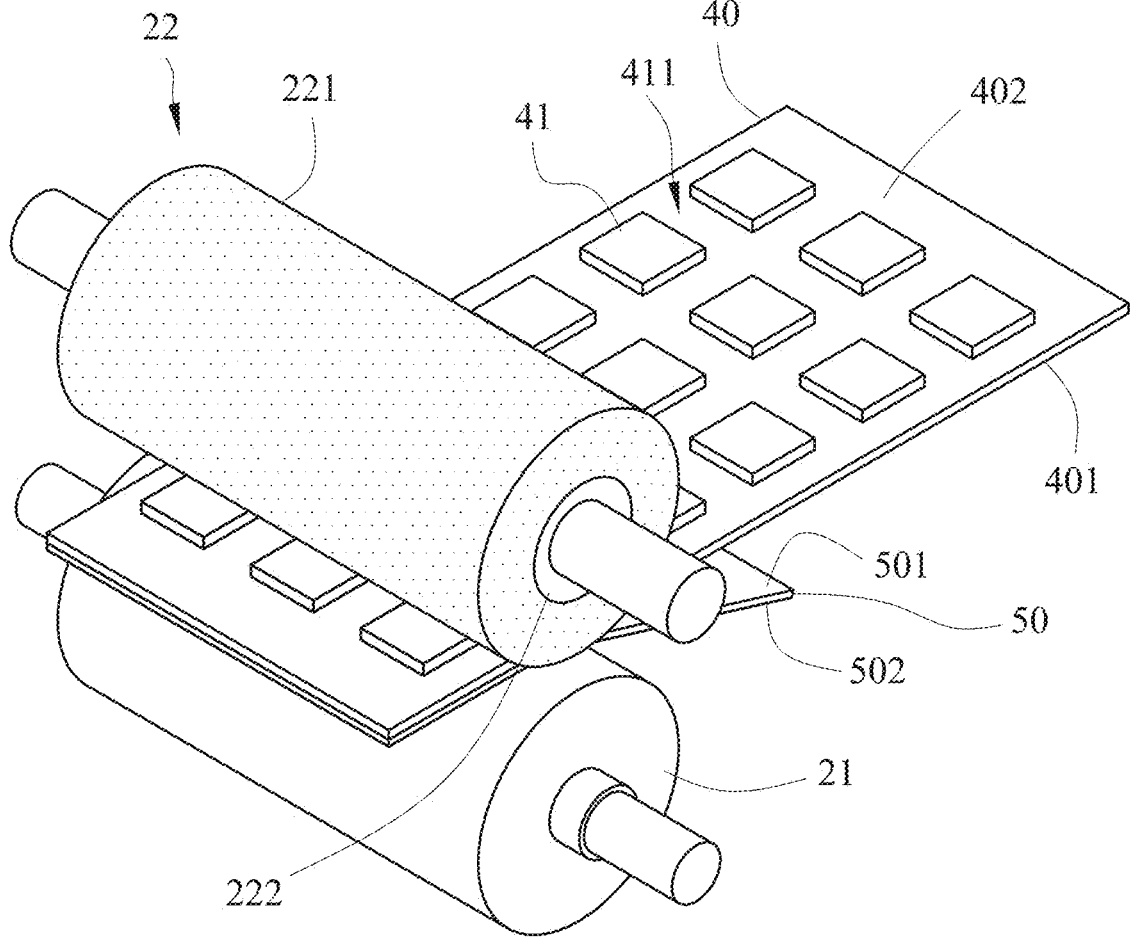
FIG. 4A is a schematic diagram of the embodiment of the system for bonding films of this invention, showing the deformable roller and the bonding roller pressing the first film and the second film simultaneously.

FIG. 4A is a schematic diagram showing the deformable roller 22 and the bonding roller 21 pressing the first film 50 and the second film 40 respectively. The bonding roller 21 presses the first surface 501 of the first film 50 toward to the first surface 401 of the second film 40. Also, the deformable roller 22 presses the first surface 401 of the second film 40 toward to the first surface 501 of the first film 50 to make the first film 50 and the second film 40 be bonded with each other. In the figure, the elements 41 on the second surface 402 of the second film 40 is arranged in a matrix. It can also be in an irregular arrangement.

Figure 4B:
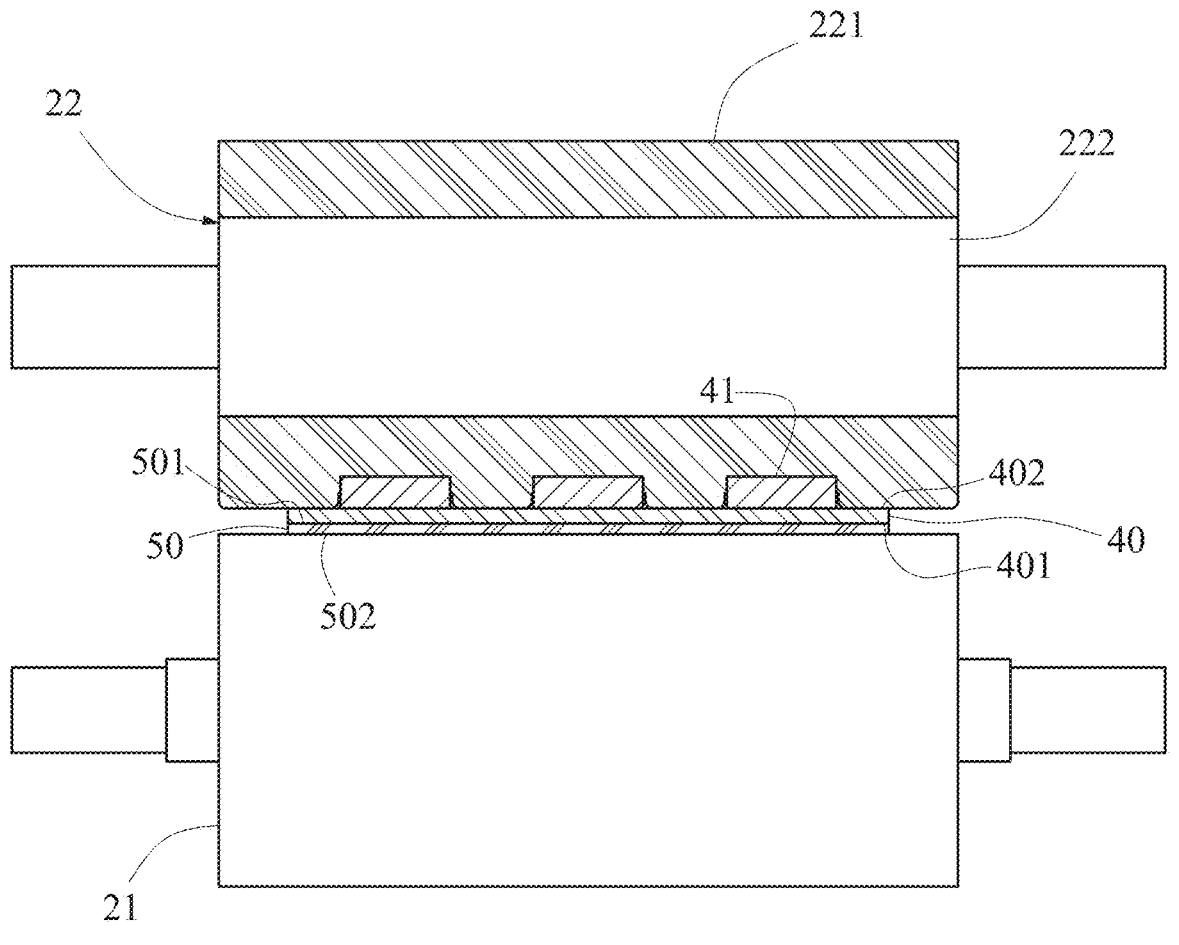
FIG. 4B is a cross-sectional view of the embodiment of the system for bonding films of this invention, showing the deformable roller and the bonding roller pressing the first film and the second film simultaneously.
Figure 5A:
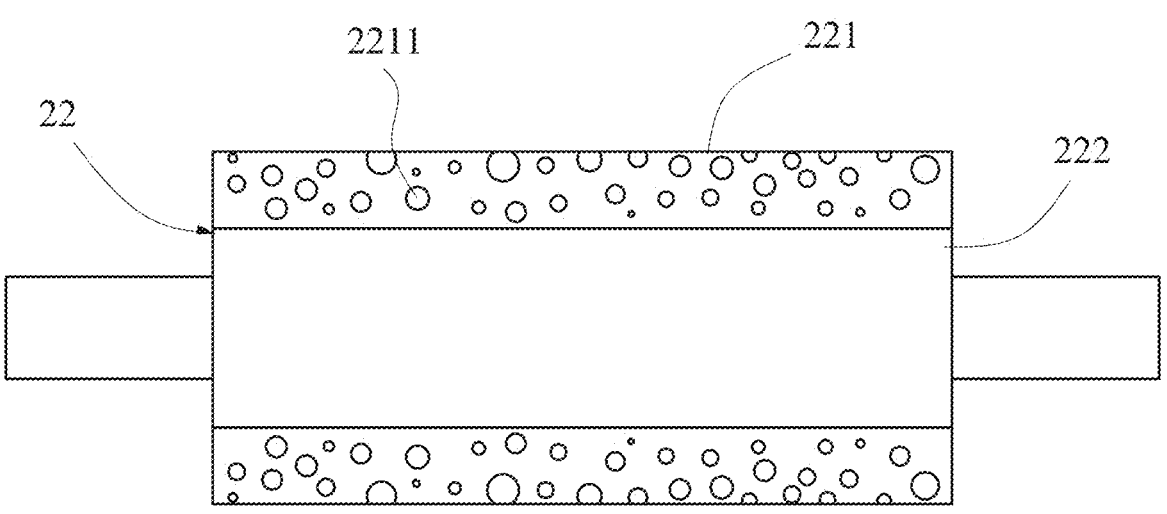
FIGS. 5A and 5B are schematic diagrams of another embodiment of the system for bonding films of this invention.
Figure 5B:
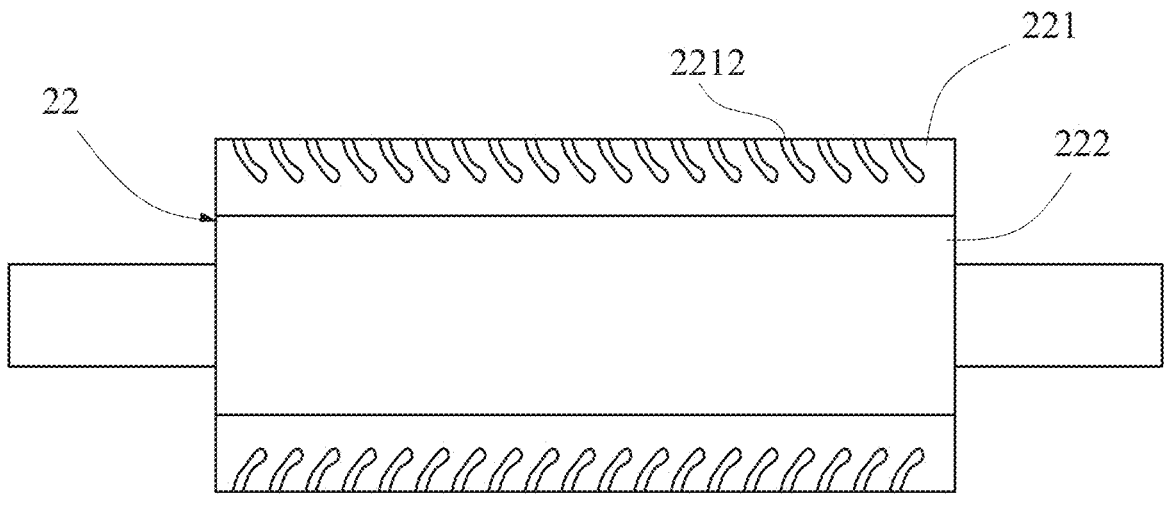

FIG. 4B is a cross-sectional view taken along a central line of a rolling axis of the deformable roller 22 and a central line of a rolling axis of the bonding roller 21. In FIG. 4B, the bonding roller 21 presses the first surface 501 of the first film 50 toward to the first surface 401 of the second film 40, and the deformable roller 22 presses the first surface 401 of the second film 40 toward to the first surface 501 of the first film 50. In details, the deformable outer layer 221 of the deformable roller 22 produces enough deformation to fill and press the areas not covered by the plurality of elements 41 on the second surface 402 of the second film 40. In particularly, the deformable outer layer 221 produces enough deformation to fill the gap space 411 between the adjacent elements 41. Therefore, the first film 50 and the second film 40 can be bonded to produce a composite film without wrinkles. The deformable outer layer 221 may has a plurality of holes 2211 inside, see FIG. 5A, or have a plurality of pores 2212 on the outer surface, see FIG. 5B. These types of the deformable outer layer 221 can produce enough deformation to fill the gap space 411 between the adjacent elements 41 during bonding.

Figure 6:
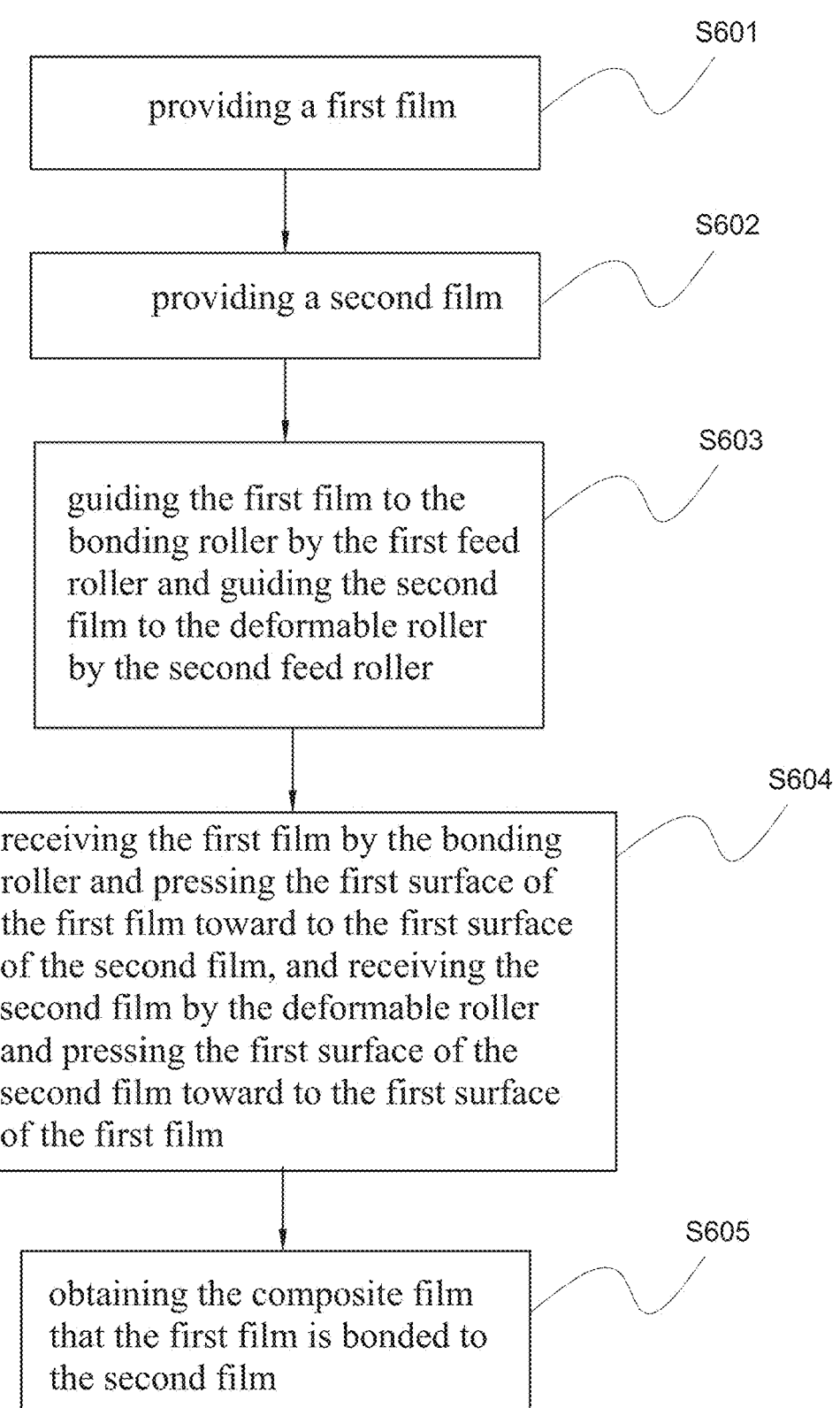
FIG. 6 is a flow diagram of the method for preparing a composite film by using the system for bonding films of this invention.

FIG. 6 is a flow diagram of the method for preparing a composite film by using the system for bonding films of this invention. The method for preparing the composite film includes the steps of:

in the step S601, providing a first film 50;

in the step S602, providing a second film 40;

in the step S603, guiding the first film 50 to the bonding roller 21 by the first feed roller 31 and guiding the second film 40 to the deformable roller 22 by the second feed roller 32;

in the step S604, receiving the first film 50 by the bonding roller 21 and pressing the first surface 501 of the first film 50 toward to the first surface 401 of the second film 40, and receiving the second film 40 by the deformable roller 22 and pressing the first surface 401 of the second film 40 toward to the first surface 501 of the first film 50, wherein the deformable outer layer 221 of the deformable roller 22 produces deformation to fill the at least one gap space 411 on the second surface 402 of the second film 40; and in the step S605, obtaining the composite film that the first film 50 is bonded to the second film 40.

Accordingly, the present invention provides a system for bonding films and method for preparing a composite film using the same to solve the problems of generating wrinkles when the film without sufficient stiffness bond to another film, especially suitable for the film without sufficient stiffness having a plurality of elements thereon. The system of this invention includes the deformable roller, which produces enough deformation during bonding to fill the gap space between the elements of the film without sufficient stiffness. Therefore, the film without sufficient stiffness and another film can be bonded with each other flatly to produce a composite film without wrinkles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A system for bonding films, comprising:

a first film, having a first surface and a second surface opposed to the first surface;

a second film, with a stiffness less than that of the first film and having a first surface and a second surface opposed to the first surface, a thickness of the second film being less than that of the first film, wherein the first surface of the second film is configured to orientate to the first surface of the first film, and the second surface of the second film includes a plurality of elements and at least one gap space uncovered by the elements, each gap space being located between two adjacent elements of the plurality of elements on the second film;

a bonding roller, configured to contact the second surface of the first film; and a deformable roller, configured to contact the second surface of the second film and disposed adjacent the bonding roller, wherein the deformable roller has a deformable outer layer and the deformable roller produces deformation to fill the at least one gap space on the second surface of the second film, wherein the bonding roller is configured to indirectly contact to the deformable roller via the first film and the second film, the deformable roller is configured to indirectly contact to the bonding roller via the first film and the second film, and the bonding roller has a Shore A hardness greater than that of the deformable roller.

2. The system for bonding films of claim 1, wherein each of the elements is a positive active material layer, a negative active material layer or a glue frame of a battery.

3. The system for bonding films of claim 1, wherein a distance between two adjacent elements is 2-150 millimeters.

4. The system for bonding films of claim 1, wherein the deformable roller includes an inner roller covered by the deformable outer layer.

5. The system for bonding films of claim 1, wherein a hardness of the deformable outer layer of the deformable roller is from 15 Shore A to 50 Shore A.

6. The system for bonding films of claim 5, wherein a thickness of the deformable outer layer of the deformable roller is 1-4 millimeters.

7. The system for bonding films of claim 6, wherein the deformable outer layer of the deformable roller is made of a polymer.

8. The system for bonding films of claim 7, wherein the deformable outer layer of the deformable roller is porous.

9. A method for preparing a composite film by using the system for bonding films of claim 1, comprising the steps of:

receiving the first film by the bonding roller and pressing the first surface of the first film toward to the first surface of the second film, and receiving the second film by the deformable roller and pressing the first surface of the second film toward to the first surface of the first film, wherein the deformable outer layer of the deformable roller produces deformation to fill the at least one gap space on the second surface of the second film; and obtaining the composite film that the first film is bonded to the second film.

\* \* \* \* \*